United States Patent
Dai et al.

(10) Patent No.: US 8,310,371 B2
(45) Date of Patent: Nov. 13, 2012

(54) POWER SUPPLY PROTECTION DEVICE

(75) Inventors: Lung Dai, Taipei Hsien (TW);
Yong-Song Shi, Shenzhen (CN);
Qiao-Lin Deng, Shenzhen (CN); Yong Xiong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 985 days.

(21) Appl. No.: 12/346,871

(22) Filed: Dec. 31, 2008

(65) Prior Publication Data

US 2009/0243870 A1 Oct. 1, 2009

(30) Foreign Application Priority Data

Mar. 26, 2008 (CN) .......................... 2008 1 0300722

(51) Int. Cl.
*G08B 21/00* (2006.01)

(52) U.S. Cl. ........ 340/662; 340/650; 340/652; 340/661; 363/53; 361/104

(58) Field of Classification Search .................. 340/662, 340/650, 652, 661; 363/53; 336/200; 320/106; 361/104
See application file for complete search history.

(56) References Cited

U.S. PATENT DOCUMENTS

| | | | |
|---|---|---|---|
| 3,743,889 A * | 7/1973 | Lopez-Batiz | 361/77 |
| 4,992,723 A * | 2/1991 | Zylstra et al. | 323/324 |
| 5,764,495 A * | 6/1998 | Faulk | 363/21.13 |
| 7,023,679 B2 | 4/2006 | Tomiyama | |
| 2002/0122323 A1* | 9/2002 | Nagaya et al. | 363/56.08 |
| 2003/0042874 A1* | 3/2003 | Anderson et al. | 322/28 |
| 2004/0090805 A1* | 5/2004 | Kitano | 363/55 |
| 2005/0135036 A1* | 6/2005 | Kanamori et al. | 361/93.1 |
| 2006/0267413 A1* | 11/2006 | Rothenbaum et al. | 307/125 |
| 2008/0062586 A1* | 3/2008 | Apfel | 361/18 |
| 2008/0130336 A1* | 6/2008 | Taguchi | 363/125 |
| 2008/0144341 A1* | 6/2008 | Cook | 363/53 |
| 2008/0197804 A1* | 8/2008 | Onishi et al. | 320/108 |
| 2010/0102977 A1* | 4/2010 | Wang et al. | 340/650 |

FOREIGN PATENT DOCUMENTS

CN 1592019 A 3/2005

* cited by examiner

*Primary Examiner* — Hoi Lau
(74) *Attorney, Agent, or Firm* — Altis Law Group, Inc.

(57) ABSTRACT

A power supply protection device for an electric appliance includes a switching circuit for establishing an electrical connection to receive an external voltage from the external power supply and output the external voltage to the electric appliance, a detecting circuit for disabling the switch circuit to break the electrical connection when determining the external voltage is equal to or higher than a predetermined value, and an alert circuit for generating an alert signal when the electrical connection is broken and outputting the alert signal to a user.

17 Claims, 2 Drawing Sheets

POWER SUPPLY PROTECTION DEVICE

BACKGROUND

1. Field of the Invention

Embodiments of the present disclosure relate to overvoltage protectors, and particularly to a power supply protection device having an overvoltage protection function.

2. Description of Related Art

Electric appliances powered by the mains power (also known as household power, grid power, etc.) have corresponding rated input voltages. However, parameters, such as voltage and frequency, for different mains power systems vary among regions. The voltages supplied by the mains power systems are generally in the range 100-240 volts (expressed as root-mean-square voltage). When an electric appliance is connected to a mains power system supplying a voltage higher than the rated input voltage of the electric appliance, the electric appliance may be damaged. In another case, even if the electric appliance is connected to a mains power system supplying a voltage conforming to the rated input voltage of the electric appliance, the electric appliance may also be damaged by high voltage surges.

Therefore, a power supply protection device having an overvoltage protection function for an electric appliance is needed to address the limitations described.

DETAILED DESCRIPTION OF CERTAIN INVENTIVE EMBODIMENTS

Reference will now be made to the drawings to describe certain inventive embodiments of the present disclosure.

Figure 1:
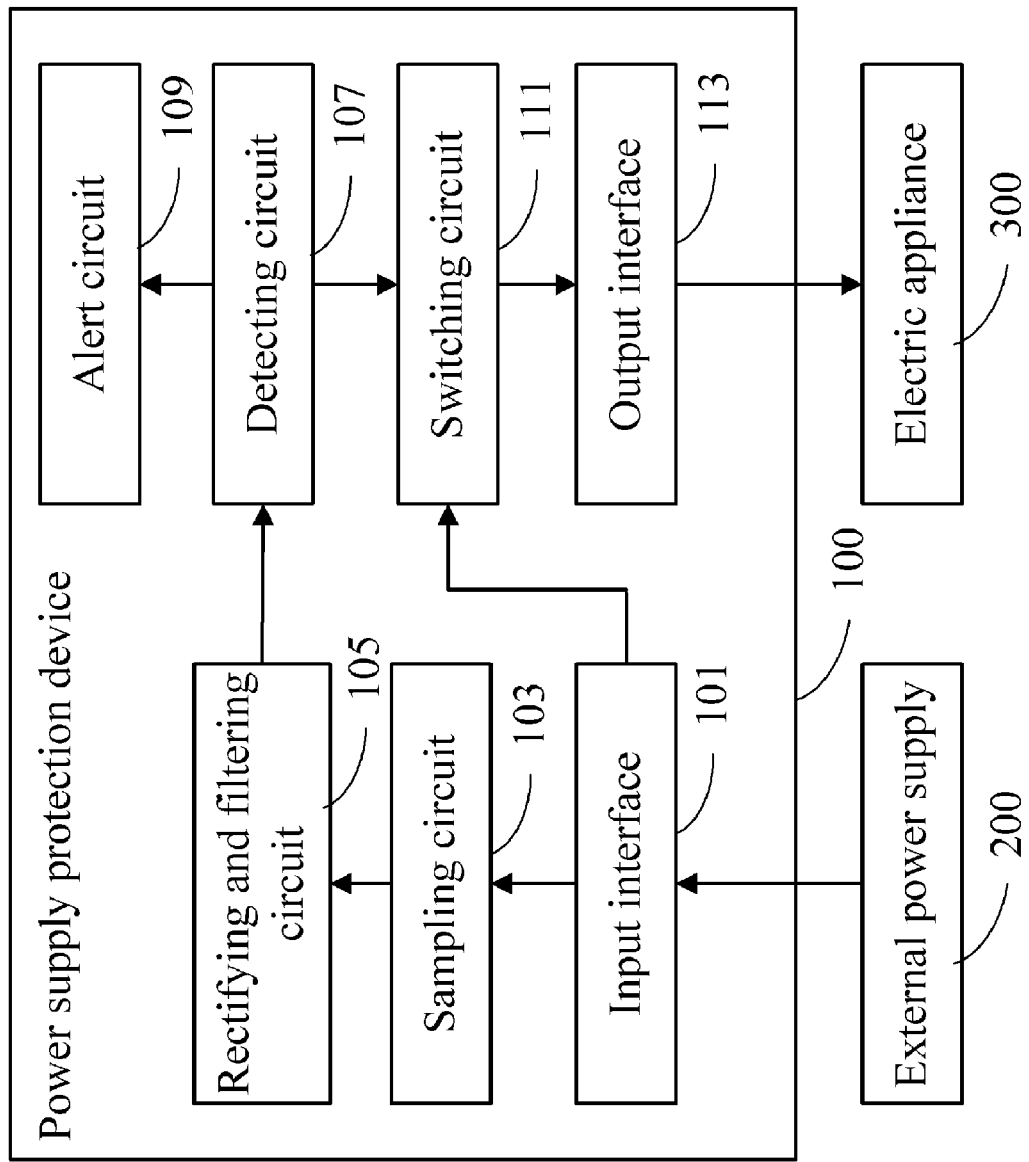
FIG. 1 is a block diagram of a power supply protection device in accordance with an embodiment of the present disclosure.

Referring to FIG. 1, a power supply protection device 100 is capable of supplying power received from an external power supply 200, such as a mains power system, to an electric appliance 300 when an external voltage (root-mean-square voltage) of the external power supply 200 is normal, and inhibiting the power when the external voltage becomes an overvoltage. The power supply protection device 100 may include an input interface 101, a sampling circuit 103, a rectifying and filtering circuit 105, a detecting circuit 107, an alert circuit 109, a switching circuit 111, and an output interface 113.

The input interface 101 is used for receiving the external voltage. The output interface 113 is connected to the input interface 101 via the switching circuit 111. The output interface 113 is used for outputting the external voltage to the electric appliance 300 when the switching circuit 111 establishes an electrical connection between the input and output interfaces 101, 113. The input interface 101 and the output interface may be power plugs or jacks.

The sampling circuit 103 is connected between the input interface 101 and the rectifying and filtering circuit 105, for generating a first sample voltage proportional to the external voltage. The rectifying and filtering circuit 105 is used for rectifying the first sample voltage into a direct current (DC) voltage, and then filtering the DC voltage. Understandably, the DC voltage is proportional to the external voltage. For example, when the external voltage is 220 volts, the DC voltage may be about 20 volts. If the sampling circuit 103 is omitted, the DC voltage may be about 140 volts, and a power consumption of the power supply protection device 100 is much higher than that when the DC voltage is about 20 volts.

The detecting circuit 107 is configured for receiving the DC voltage, and determining whether the external voltage is at the overvoltage level, that is, the external voltage is equal to or higher than a predetermined value. Because the DC voltage is proportional to the external voltage, when the external voltage is equal to or higher than the predetermined value, the DC voltage is equal to or higher than a critical voltage. In this embodiment, the detecting circuit 107 generates a switch-off signal when the DC voltage is equal to or higher than the critical voltage, and generates a switch-on signal when the DC voltage is lower than the critical voltage.

The alert circuit 109 is used for generating an audible or visual alert signal to signal that the external voltage becomes the overvoltage when receiving the switch-off signal from the detecting circuit 107.

As described above, the switching circuit 111 is used for establishing the electrical connection between the input interface 101 and the output interface 113, such that the external voltage is transmitted from the input interface 101 to the output interface 113 and then outputted to the electric appliance 300. In this embodiment, the switching circuit 111 establishes/closes the electrical connection when receiving the switch-on signal from the detecting circuit 107, and breaks/opens the electrical connection when receiving the switch-off signal, such that the power supply protection device 100 stops supplying the power to the electric appliance 300.

Figure 2:
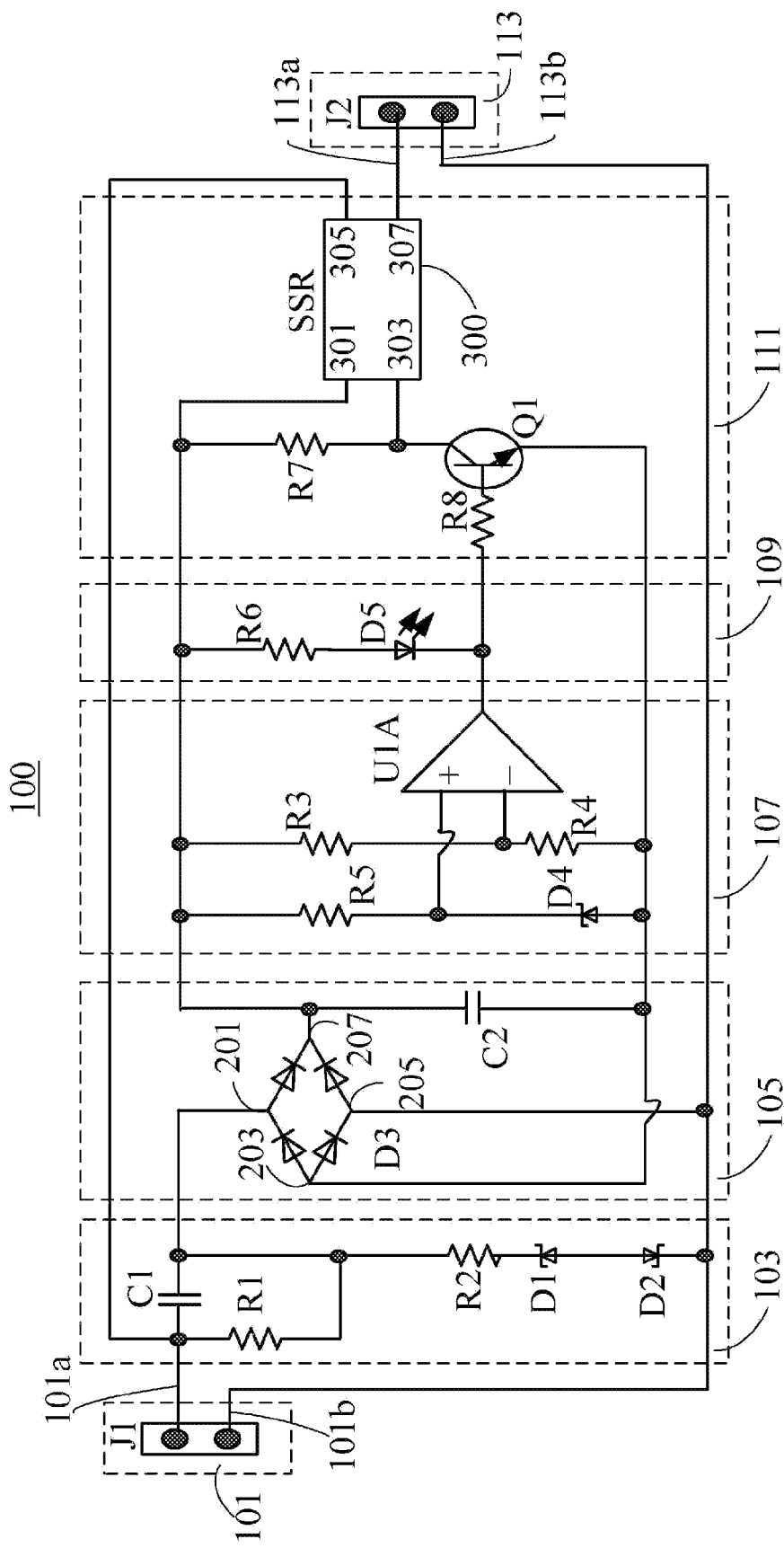
FIG. 2 is a circuit diagram of the power supply protection device of FIG. 1.

Referring also to FIG. 2, the input interface 101 includes a plug J1 having two terminals 101a, 101b, which are capable of connecting to the external power supply 200 to receive the external voltage. The output interface 113 includes a jack (may also be a plug) J2 having two terminals 113a, 113b, which are capable of connecting to the electric appliance 300. The terminal 101a of the plug J1 is connected to the terminal 113a of the jack J2 via the switching circuit 111. The terminal 101b is directly connected to the terminal 113b.

The sampling circuit 103 includes a first resistor R1, a second resistor R2, a first zener diode D1, and a second zener diode D2 connected together in series between the two terminals 101a, 101b for receiving the external voltage from the input interface 101. The sampling circuit 103 further includes a capacitor C1 connected in parallel to the first resistor R1. Anodes of the first and second zener diodes D1, D2 are connected together. The first sample voltage equals to a sum of voltages of the second resistor R2, the first zener diode D1, and the second zener diode D2.

The rectifying and filtering circuit 105 includes a full bridge rectifier D3 and a filter capacitor C2. The rectifier D3 includes two input terminals 201, 205 for receiving the first sample voltage, and two output terminals 203, 207 for outputting the DC voltage. The terminal 207 is a higher potential output terminal, and the terminal 203 is a lower potential output terminal. The filter capacitor C2 is connected in parallel to the two output terminals 203, 207.

The detecting circuit 107 includes a third resistor R3, a fourth resistor R4, a fifth resistor R5, a third zener diode D4, and a comparator U1A. The third and fourth resistors R3, R4 are connected in series between the two output terminals 203, 207 for receiving the DC voltage. A connecting node of the third and fourth resistors R3, R4 is connected to an inverting input terminal of the comparator U1A. A second sample voltage is generated on the fourth resistor R4, and supplied to the inverting input terminal of the comparator U1A. The second sample voltage is proportional to the DC voltage. The fifth resistor R5 and the third zener diode D4 are connected in series between the two output terminals 203, 207, and the third zener diode D4 is reverse biased. A connecting node of the fifth resistor R5 and the third zener diode D4 is connected to a non-inverting input terminal of the comparator U1A, for providing a reference voltage to the comparator U1A. An output terminal of the comparator U1A is connected to the alert circuit 109 and the switching circuit 111.

In this embodiment, the third zener diode D4 is normal and off when the external voltage is within a normal range, and the reference voltage equals to the external voltage and higher than the second sample voltage on the fourth resistor R4. Thus, the comparator U1A outputs a high level voltage, that is, the switch-on signal is the high level voltage. When the external voltage increases, the second sample voltage on the fourth resistor R4 increases, too. When the external voltage becomes equal to or higher than the predetermined value, the DC voltage becomes equal to or higher than the critical voltage, and the second sample voltage becomes higher than a zener voltage of the third zener diode D4. The third zener diode D4 is breakdown and on, and the reference voltage equals to the zener voltage of the third zener diode D4 and is lower than the second sample voltage. Thus, the comparator U1A outputs a low level voltage, that is, the switch-off signal is the low level voltage.

The alert circuit 109 includes a sixth resistor R6 and a light emitting diode D5 connected in series between the terminal 207 of the rectifying and filtering circuit 105 and the output terminal of the comparator U1A. When the comparator U1A outputs the high level voltage (switch-on signal), the light emitting diode D5 does not emit light. When the comparator U1A outputs the low level voltage (switch-off signal), the light emitting diode D5 emits light to signal that the external voltage is an overvoltage.

The switching circuit 111 includes a seventh resistor R7, an eighth resistor R8, a bipolar junction transistor Q1, and a relay 300. The relay 300 is a solid state relay. The relay 300 includes two input terminals 301, 303, and two output terminals 305, 307. The terminal 301 is connected to the terminal 207 of the rectifying and filtering circuit 105. The terminal 303 is connected to a collector of the bipolar junction transistor Q1. The terminal 305 is connected to the terminal 101a of the input interface 101. The terminal 307 is connected to the terminal 113a of the output interface 113. When a voltage at the terminal 301 is higher than a voltage at the terminal 303, the terminal 305 is connected to the terminal 307.

A gate of the bipolar junction transistor Q1 is connected to the output terminal of the comparator U1A via the eighth resistor R8. The collector of the bipolar junction transistor Q1 is connected to the terminal 207 of the rectifying and filtering circuit 105 via the seventh resistor R7. An emitter of the bipolar junction transistor Q1 is connected to the terminal 203 of the rectifying and filtering circuit 105.

When receiving the high level voltage (switch-on signal), the bipolar junction transistor Q1 turns on, the voltage at the terminal 303 is equal to a voltage at the terminal 203 of the rectifying and filtering circuit 105. Thus the voltage at the terminal 301 is higher than that at the terminal 303, and the terminal 305 is connected to the terminal 307 of the relay 300. As a result, the external voltage is outputted from the output interface 113.

When receiving the low level voltage (switch-off signal), the bipolar junction transistor Q1 turns off, the voltage at the terminal 303 is equal to the voltage at the terminal 301, and the terminal 305 is disconnected from the terminal 307 of the relay 300. As a result, the electrical connection between the input interface 101 and the output interface 113 is broken.

To sum up, the power supply protection device 100 establishes the electrical connection between the external power supply 200 and the electric appliance 300 for transmitting power when the external voltage supplied by the external power supply 200 is normal, and breaks the electrical connection when the external voltage becomes an overvoltage. As a result, the electric appliance 300 is protected from damage by high voltage surges or overvoltages.

In other embodiments, when the external voltage is a DC voltage, the sampling circuit 103 and the rectifying and filtering circuit 105 can be omitted.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A power supply protection device, comprising:
   a switching circuit for establishing an electrical connection to receive an external voltage from an external power supply and output the external voltage to an electric appliance;
   a detecting circuit for disabling the switch circuit to break the electrical connection when determining the external voltage is equal to or higher than a predetermined value and enabling the switch circuit to establish the electrical connection when determining the external voltage is lower than the predetermined value; and
   an alert circuit for generating an alert signal when the electrical connection is broken, and outputting the alert signal to a user; a sampling circuit for generating a first sample voltage proportional to the external voltage; and a rectifying and filtering circuit for converting the first sample voltage into a direct current voltage, and sending the direct current voltage to the detecting circuit.

2. The power supply protection device as claimed in claim 1, wherein the detecting circuit generates a second sample voltage according to the direct current voltage, and determines whether the external voltage is equal to or higher than a predetermined value by comparing the second sample voltage with a reference voltage.

3. The power supply protection device as claimed in claim 1, wherein the sampling circuit comprises a first resistor, a second resistor, a first zener diode, and a second zener diode connected together in series for receiving the external voltage, anodes of the first and second zener diodes are connected together, the first sample voltage equals to a sum of voltages of the second resistor, the first zener diode, and the second zener diode.

4. The power supply protection device as claimed in claim 3, further comprising a capacitor connected in parallel to the first resistor.

5. The power supply protection device as claimed in claim 1, wherein the rectifying and filtering circuit comprises a full bridge rectifier and a filter capacitor.

6. The power supply protection device as claimed in claim 4, wherein the detecting circuit comprises a third resistor, a fourth resistor, a fifth resistor, a third zener diode, and a comparator, the third and fourth resistors are connected in series for receiving the direct current voltage, the fifth resistor and the third zener diode are connected in series for receiving the direct current voltage, the third zener diode is reverse biased, a connecting node of the third and fourth resistors is connected to an inverting input terminal of the comparator, and a connecting node of the fifth resistor and the third zener diode is connected to a non-inverting input terminal of the comparator.

7. The power supply protection device as claimed in claim 6, wherein the alert circuit comprises a light emitting diode and a sixth resistor connected in series between a higher potential output terminal of the rectifying and filtering circuit and an output terminal of the detecting circuit.

8. The power supply protection device as claimed in claim 1, wherein the detecting circuit generates a switch-on signal when determining the external voltage is lower than a predetermined value.

9. The power supply protection device as claimed in claim 8, wherein the switching circuit comprises a bipolar junction transistor and a relay; the bipolar junction transistor turns on when receiving the switch-on signal, and controls the relay to close to establish the electrical connection.

10. The power supply protection device as claimed in claim 9, wherein the bipolar junction transistor is turned off by the switch-off signal to further control the relay to break the electrical connection.

11. The power supply protection device as claimed in claim 10, wherein the relay is a solid state relay.

12. A power supply protection device, comprising:
an input interface for receiving an external voltage;
an output interface for outputting the external voltage;
a detecting circuit for generating a switch-off signal when determining the external voltage is equal to or higher than a predetermined value and generating a switch-on signal when determining the external voltage is lower than the predetermined value;
an alert circuit for generating an alert signal when receiving the switch-off signal; and
a switching circuit connected between the input interface and the output interface, for breaking the connection between the input interface and the output interface when receiving the switch-off signal and establishing the connection between the input interface and the output interface when receiving the switch-on signal; a sampling circuit for generating a first sample voltage proportional to the external voltage; and a rectifying and filtering circuit for converting the first sample voltage into a direct current voltage, and sending the direct current voltage to the detecting circuit.

13. The power supply protection device as claimed in claim 12, wherein the detecting circuit generates a second sample voltage according to the direct current voltage, and determines whether the external voltage is equal to or higher than a predetermined value by comparing the second sample voltage with a reference voltage.

14. The power supply protection device as claimed in claim 12, wherein the sampling circuit comprises a first resistor, a second resistor, a first zener diode, and a second zener diode connected together in series for receiving the external voltage via the input interface, anodes of the first and second zener diodes are connected, the first sample voltage equals to a sum of voltages of the second resistor, the first zener diode, and the second zener diode.

15. The power supply protection device as claimed in claim 14, wherein the detecting circuit comprises a third resistor, a fourth resistor, a fifth resistor, a third zener diode, and a comparator, the third and fourth resistors are connected in series for receiving the direct current voltage, the fifth resistor and the third zener diode are connected in series for receiving the direct current voltage, the third zener diode is reverse biased, a connecting node of the third and fourth resistors is connected to an inverting input terminal of the comparator, and a connecting node of the fifth resistor and the third zener diode is connected to a non-inverting input terminal of the comparator.

16. The power supply protection device as claimed in claim 12, wherein the switching circuit comprising a bipolar junction transistor and a relay; the bipolar junction transistor is turned on by the switch-on signal to further close the relay to transmit the external voltage from the input interface to the output interface.

17. The power supply protection device as claimed in claim 16, wherein the bipolar junction transistor turns off when receiving the switch-off signal, and controls the relay to break the connection between the input interface and the output interface.

* * * * *